United States Patent Office  3,480,663
Patented Nov. 25, 1969

3,480,663
TERPENE ESTER CARBAMIC ACIDS
Kurt Thiele, Frankfurt am Main, Germany, assignor to Deutsche Gold- und Silber-Scheideanstalt vormals Roessler, Frankfurt am Main, Germany
No Drawing. Filed July 12, 1966, Ser. No. 564,547
Claims priority, application Germany, July 13, 1965, D 47,716
Int. Cl. C07c *125/06;* C07d *29/24;* A61k *27/00*
U.S. Cl. 260—482   6 Claims

ABSTRACT OF THE DISCLOSURE

Terpene esters of the formula $$T-Y-\overset{\overset{\displaystyle O}{\|}}{C}-R$$

wherein T is a terpinyl radical selected from the group consisting of linalyl, neryl, citronellyl, geranyl, menthyl, t-terpinyl, bornyl, fenchyl and bisabolyl, Y is selected from the group consisting of oxygen and sulfur and R is selected from the group

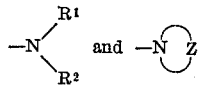

wherein $R^1$ and $R^2$ each taken individually is selected from the group consisting of hydrogen, cycloalkyl, aralkyl, aryl, substituted aryl, pyridyl, substituted pyridyl, lower alkyl, substituted lower alkyl, lower alkenyl, substituted lower alkenyl and Z is selected from the group consisting of alkylene, oxa-alkylene and aza-alkylene which have antiinflammatory action.

---

The present invention concerns the discovery that certain esters of terpene alcohols or thioalcohols of the following formula unexpectedly have good antiinflammatory properties:

$$T-Y-CO-R$$

wherein T is a terpene radical derived from an acylic or cyclic terpene of the formulae $C_nH_{2n-x}$ or $C_nH_{2n-y}OH$ by splitting off one hydrogen atom in the first instance or by splitting off the hydroxyl group in the second instance ($n=5-20$, $x=0-6$ and $y=0-6$); Y is oxygen or sulfur; R is a saturated alicyclic ring of 3 to 8 members, alkcycloalkenyl, aryl, disubstituted aryl

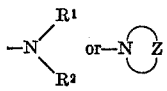

wherein each of $R^1$ and $R^2$ taken individually is hydrogen, cycloalkyl, aralkyl, aryl, substituted aryl, pyridyl, substituted pyridyl, lower alkyl, lower alkenyl, substituted lower alkyl and substituted lower alkenyl and Z is alkylene of 4 to 7 carbon atoms as in pyrrolidine and piperidine and dimethyl piperidine, oxa-alkylene as in morpholine or aza-alkylene as in piperazine or homopiperazine. In addition when T is bisabolyl R can also be monosubstituted aryl, unsubstituted or substituted alkyl or alkenyl of 2 to 10 carbon atoms. The substituents where applicable preferably are halogen, lower alkyl, hydroxy lower alkoxy, phenyl amino pyridyl and dilower alkyl amino lower alkyl.

Illustrative terpene radicals, for instance are bisabolyl, linalyl, neryl, citronellyl, geranyl, menthyl, α-terpinyl, β-terpinyl, terpinyl (4), bornyl, or fenchyl.

The terpene esters concerned according to the invention exhibit a very good antiphlogistic action on albumen edema of the rat paw when administered orally, intramuscularly or intravenously in a dosage range of 1–500 mg./kg. The acute toxicity LD 50 mg./kg. in mice upon oral administration is over 1000 mg./kg.

Such terpene esters as already mentioned are antiinflammatory medicaments, with the following indications:

Chronic polyarthritis
Rheumatic ailments
Posttraumatic inflammations
Postoperative inflammations
Swellings with fractures
Thrombophlebitis in all forms (including post-operative)
Bursitis
Synovitis
Collagenoses (polymyositis, periarthritis)
Gout
Intraperitoneal adhesions.

The medicaments according to the invention, if desired, also in combination with other pharmaceutically active substrances, can be administered as pharmaceutical compositions which are suitable for enteral or parenteral administration. The administration can be in the form of tablets, capsules, pills, dragees, suppositories, oily or aqueous solutions or suspensions, emulsions, injectable aqueous or oily solutions or suspensions. The individual doses, depending on form of administration, are between 0.1 and 100 mg., one to three times a day.

The terpene esters concerned can be prepared, for instance, by:

(1) Reacting a terpene alcohol or thioalcohol of the formula $$T-YH$$

with an acid halide of the formula $$Hal-CO-R$$

wherein Hal is a halogen atom in the presence of a basic substance in a solvent at temperatures between 0° and 150° C., preferably, at about 100° C.

(2) Reacting a terpene alcohol or thioalcohol of the formula $$T-YH$$

with an isocyanate of the formula $$O=C=N-R$$

in the presence or absence of a solvent at temperatures between about 50° and 150° C.

(3) Reacting a terpene halide of the formula $$Ter-Hal$$

with an alkali metal or silver salt of the formula $$A-Y-CO-R$$

wherein A designates an alkali metal or silver, if desired, in the presence of a solvent, at temperatures between 20° and 200° C.

(4) Reacting a terpene alcohol or thioalcohol of the formula $$T-YH$$

with an acid of the formula $$HOOCR$$

or its lower alkyl esters at temperatures between 50° and 250° C. in the presence of a catalyst, such as aluminum chloride, zinc chloride, boron trifluoride or mineral acids and if desired in the presence of an inert solvent.

Suitable basic substances for procedure 1, for example, are pyridine, tertiary amines, such as, triethyl amine and dimethyl aniline, soda, potash and the like. In procedure 1 it also is possible first to prepare the terpene alcoholates or thioalcoholates from the terpene alcohol or thioalcohol with the aid of alkali metal amides, alkali metals or alkali metal hydrides and then to react these with the acid halide.

Suitable solvents, for instance, are: pyridine, aromatic hydrocarbons, dioxane, tetrahydrofurane, dimethyl sulfoxide, N-methyl pyrrolidone and acetone.

The terpene esters produced, if they are racemates, can be resolved into their optically active components by known methods. Also, if desired, those products containing a nitrogen atom can be converted to the corresponding pharmaceutically acceptable non-toxic salts or quaternary ammonium compounds.

The following examples will serve to illustrate the anti-inflammatory terpene esters concerned according to the invention.

In the formulae given in such examples the various terpene radicals concerned, for simplicity's sake, are designated by the abbreviations indicated below:

| Terpene radical | Abbreviation |
| --- | --- |
| (CH₃)₂C=CH—CH₂—CH₂—C— with CH₃ substituent and cyclohexene ring with CH₃ bisabolyl | Bisab. |
| (CH₃)₂C=CH—CH₂—CH₂—C— with CH₃ and CH=CH₂ linalyl | Lin. |
| (CH₃)₂C=CH—CH₂—CH₂—C=CH—CH₂— with CH₃ (cis) neryl | Ner. |
| (CH₃)₂C=CH—CH₂—CH₂—CH—CH₂—CH₂— with CH₃ citronellyl | Citr. |
| (CH₃)₂C=CH—CH₂—CH₂—C=CH—CH₂— with CH₃ (trans) geranyl | Ger. |
| bornane structure methyl | Men. |
| α-terpinyl structure | α—Terp. |
| bornyl structure | Born. |
| fenchyl structure | Fench. |

EXAMPLE 1

Benzoic acid bisabolyl ester

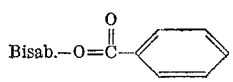

10 g. of (—)-α-bisabolol were boiled under reflux with 6.3 g. of benzoyl chloride in 20 ml. of pyridine for 3 hours. After the reaction mixture had cooled down it was taken up in benzene, washed with water and then with dilute NaOH. After the washed benzene solution had been dried with potassium carbonate, it was boiled down and the residue distilled under vacuum. The main fraction (5 g.) distilled over at 170–173° C. at 0.5 torr.

The following cycloalkyl carboxylic acid esters were prepared analogously from (—)-α-bisabolol and the carboxylic acid chloride indicated:

(a) Cyclopropyl carboxylic acid bisabolyl ester

boiling point 120° C. at 0.01 torr from cyclopropyl carbonyl chloride.

(b) Cyclopentyl carboxylic acid bisabolyl ester

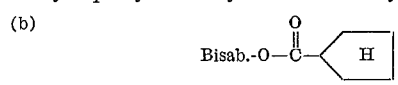

boiling point 136° C. at 0.011 torr from cyclopentyl carbonyl chloride.

EXAMPLE 2

4-fluoro-benzoic acid bisabolyl ester

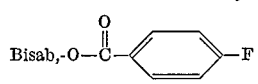

7.8 g. of a 50% sodium amide suspension were added to 22 g. (—)-α-bisabolol in 80 ml. of toluene at boiling temperature and the ammonia which was produced driven off with nitrogen. Thereafter 16 g. of p-fluorobenzoyl chloride were added portionwise. The reaction mixture was processed as in Example 1. 11 g. of the ester were obtained with a boiling point of 170° C. at 0.5 torr.

EXAMPLE 3

N,N-dimethyl-carbamic acid bisabolyl ester

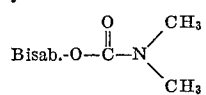

25 g. of (—)-α-bisabolol in 50 ml. of toluene were converted at boiling temperature with 9 g. of a sodium amide suspension (50%) to the corresponding alcoholate which was then reacted with 12 g. of N,N-dimethyl carbonyl chloride. After 15 minutes the solution was washed with water, dried with potassium carbonate and boiled down. The residue was then distilled under vacuum. The desired ester distilled over at 122° C. at 0.1 torr. The yield was 21 g.

The following carbamic acid esters were prepared analogously from (—)-α-bisabolol and the carbonyl chloride corresponding to the carbamyl group of the ester produced:

(a) N,N-diethyl-carbamic acid bisabolyl ester

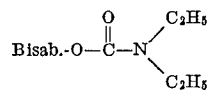

boiling point 132° C. at 0.01 torr.

(b) N,N-dipropyl-carbamic acid bisabolyl ester

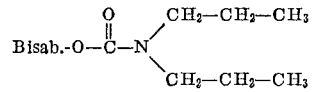

boiling point 152° C. at 0.01 torr.

(c) N,N-diisopropyl-carbamic acid bisabolyl ester

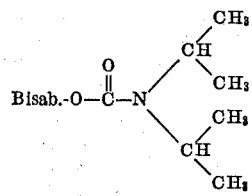

boiling point 135° C. at 0.01 torr.

(d) N,N-dibutyl-carbamic acid bisabolyl ester

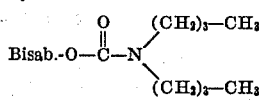

boiling point 159° C. at 0.01 torr.

(e) N,N-diisobutyl-carbamic acid bisabolyl ester

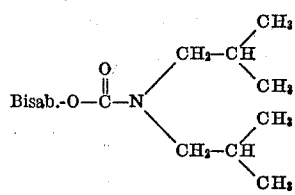

boiling point 150° C. at 0.01 torr.

(f) N,N-diallyl-carbamic acid bisabolyl ester

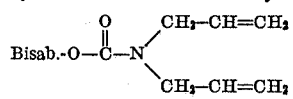

boiling point 155° C. at 0.1 torr.

(g) Pyrrolidino carboxylic acid bisabolyl ester

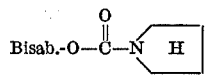

boiling point 165° C. at 0.5 torr.

(h) Piperidino carboxylic acid bisabolyl ester

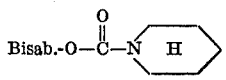

boiling point 172° C. at 0.2 torr.

(i) 2,6-dimethyl piperidino carboxylic acid bisabolyl ester

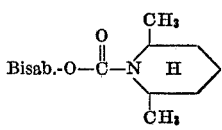

boiling point 165–170° C. at 0.1 torr.

(j) Morpholino carboxylic acid bisabolyl ester

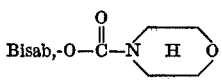

boiling point 169° C. at 0.01 torr.

EXAMPLE 4

Pyrrolidino carboxylic acid linalyl ester

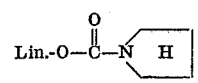

was prepared by a process analogous to that of Example 2. Its pointing point at 0.01 torr was 103° C.

EXAMPLE 5

N-cyclohexyl carbamic acid neryl ester

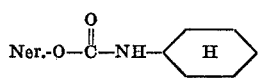

154 g. of nerol were heated with 2.5 g. of cyclohexyl isocyanate at 100° C. The temperature then rose spontaneously to about 130° C. After ½ hour the reaction product was distilled under vacuum. 20 g. of the desired ester distilled over at 135° C. at 0.01 torr.

EXAMPLE 6

N-phenyl-carbamic acid citronellyl ester

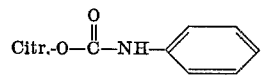

15.6 g. of citronellol were mixed with 11 g. of phenyl isocyanate. The mixture heated spontaneously to a temperature around 100° C. After 1 hour the reaction mixture was distilled under vacuum. The desired ester distilled over at 155° C. at 0.005 torr. The yield was 16 g.

EXAMPLE 7

N-n-butyl-carbamic acid citronellyl ester

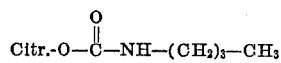

20 g. of citronellol were mixed with 14.6 ml. of n-butyl isocyanate whereupon the mixture spontaneously heated to 85° C. After ½ hour the reaction mixture was distilled under vacuum. The desired ester distilled over at 125° C. at 0.01 torr. The yield was 21 g.

EXAMPLE 8

N,N-diallyl-carbamic acid geranyl ester

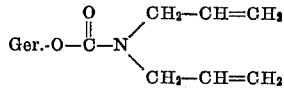

25 g. of geraniol were reacted with 12.7 g. of a 50% sodium amide suspension in 50 ml. of toluene at boiling temperature to produce the alcoholate which was then reacted with 26 g. of diallyl carbamoyl chloride. Upon distillation 26 g. of N,N-diallyl carbamic acid geranyl ester with a boiling point of 120° C. at 0.01 torr were obtained.

EXAMPLE 9

Pyrrolidino carboxylic acid menthyl ester

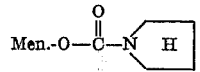

was prepared by a process analogous to that of Example 3 from menthol and pyrrolidino carbonyl chloride. Its boiling point at 0.01 torr was 115° C. and its melting point 56° C.

EXAMPLE 10

L-pyrrolidino carboxylic acid α-terpinyl ester

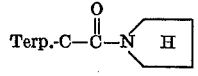

was prepared by a process analogous to that of Example 3 from L-α-terpineol and pyrrolidino carbonyl chloride. Its boiling point at 0.05 torr was 120° C. and its melting point 43° C.

EXAMPLE 11

Pyrrolidino carboxylic acid bornyl ester

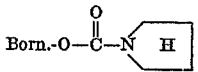

was prepared by a process analogous to that of Example 3 from borneol and pyrrolidino carbonyl chloride. Its boiling point at 0.1 torr was 115° C. and its melting point 37° C.

I claim:
1. A terpene ester of the formula

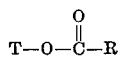

wherein T is a terpene residue of the group consisting of linalyl, neryl, citronellyl, geranyl, menthyl, terpinyl, bornyl and bisabolyl, and R is

and wherein $R_1$ and R are individually selected from the group consisting of hydrogen, lower alkyl, lower alkenyl, cyclohexyl and phenyl with the proviso that both $R_1$ and $R_3$ are not hydrogen.

2. A terpene ester according to claim 1 wherein $R_1$ and $R_2$ are individually selected from the group consisting of hydrogen, lower alkyl, allyl, cyclohexyl and phenyl.

3. A terpene ester of the formula

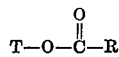

wherein T is bisabolyl, R is

and wherein $R_1$ and $R_2$ are individually selected from the group consisting of hydrogen, lower alkyl, lower alkenyl, cyclohexyl and phenyl with the proviso that both $R_1$ and $R_3$ are not hydrogen.

4. A terpene ester according to claim 3 wherein $R_1$ and $R_2$ are individually selected from the group consisting of hydrogen, lower alkyl, allyl, cyclohexyl and phenyl.

5. A bisabolyl compound according to claim 3 wherein $R_1$ is hydrogen, alkyl of 1 to 4 carbon atoms or allyl and $R_2$ is akyl of 1 to 4 carbon atoms, allyl, cyclohexyl or phenyl.

6. A bisabolyl compound according to claim 5 wherein both $R_1$ and $R_2$ are alkyl of 1 to 4 carbon atoms.

References Cited
UNITED STATES PATENTS
3,238,036   3/1966   Herrett _____ 260—482

ALEX MAZEL, Primary Examiner
JOSE TOVAR, Assistant Examiner

U.S. Cl. X.R
260—247.2, 268, 294.3, 326.3, 468, 471; 424—248, 250, 267, 274